(12) United States Patent
Bosco et al.

(10) Patent No.: US 12,038,048 B2
(45) Date of Patent: Jul. 16, 2024

(54) SYSTEM AND METHOD FOR THE IDENTIFICATION OF A MECHANICAL COMPONENT, IN PARTICULAR A ROLLING BEARING RING

(71) Applicant: Aktiebolaget SKF, Gothenburg (SE)

(72) Inventors: Luisella Bosco, Pinerolo (IT); Alberto Pieroni, Massa (IT); Stefano Richaud, San Secondo di Pinerolo (IT); Francesco Teggi, Reggio Emilia (IT)

(73) Assignee: AKTIEBOLAGET SKF (SE)

( * ) Notice: Subject to any disclaimer, the term of this patent is extended or adjusted under 35 U.S.C. 154(b) by 486 days.

(21) Appl. No.: 17/343,052

(22) Filed: Jun. 9, 2021

(65) Prior Publication Data

US 2021/0388870 A1    Dec. 16, 2021

(30) Foreign Application Priority Data

Jun. 12, 2020 (IT) .................... 102020000014053

(51) Int. Cl.
*F16C 41/00* (2006.01)
*B41J 2/21* (2006.01)
(Continued)

(52) U.S. Cl.
CPC ........... *F16C 41/008* (2013.01); *B41J 2/2107* (2013.01); *B41M 5/0047* (2013.01); *B41M 5/0058* (2013.01); *B41M 7/0081* (2013.01); *B41M 7/009* (2013.01); *C09D 11/101* (2013.01); *C09D 11/322* (2013.01)

(58) Field of Classification Search
CPC ...... F16C 41/008; F16C 33/586; F16C 33/64; F16C 2326/02; B41J 2/2107; B41J 3/413; B41J 3/4073; B41M 5/0047; B41M 5/0058; B41M 7/0081; B41M 7/009;
(Continued)

(56) References Cited

U.S. PATENT DOCUMENTS 8,006,573 B1 * 8/2011 Rode .................. G01L 5/24
                                                73/862.23
8,829,390 B2 * 9/2014 Van De Sanden ...... F16C 33/64
                                                219/121.68
(Continued)

FOREIGN PATENT DOCUMENTS

DE      102017111112     11/2018
JP      2006232889       9/2006
WO      2015003736       1/2005

OTHER PUBLICATIONS

Search Report for corresponding Italian Patent Application No. 2020000014053 dated Apr. 30, 2021.

*Primary Examiner* — Eric Blount
(74) *Attorney, Agent, or Firm* — Reed Smith LLP

(57) ABSTRACT

System and method for the identification of a mechanical component, in particular a bearing or a hub bearing unit of a vehicle or a ring thereof, consisting of a marking applied directly onto an exposed surface of the mechanical component, performed using a photopolymerizable ceramic ink which is printed on the exposed surface by an inkjet printer having a resolution equal to, or greater than, 700 dpi and which is at least partly vitrified using a heat treatment at a temperature equal to or higher than 700° C., preferably after fixing of the ceramic ink on the exposed surface by UV irradiation.

18 Claims, 2 Drawing Sheets

(51) Int. Cl.
  *B41M 5/00*   (2006.01)
  *B41M 7/00*   (2006.01)
  *C09D 11/101*  (2014.01)
  *C09D 11/322*  (2014.01)
(58) Field of Classification Search
  CPC ... B41M 5/0088; B41M 5/262; C09D 11/101; C09D 11/322
  USPC .......................................................... 340/682
  See application file for complete search history.

(56) References Cited

U.S. PATENT DOCUMENTS

2010/0147170 A1*  6/2010  Van Denend ......... B41F 27/005
                                                  101/368
2012/0312783 A1* 12/2012  Van de Sanden ...... G06K 19/06
                                                  148/579

\* cited by examiner

SYSTEM AND METHOD FOR THE IDENTIFICATION OF A MECHANICAL COMPONENT, IN PARTICULAR A ROLLING BEARING RING

CROSS REFERENCE OF RELATED APPLICATION

This application is based on and claims priority to Italian Patent Application No. 102020000014053 filed on Jun. 12, 2020, under 35 U.S.C. § 119, the disclosure of which is incorporated by reference herein.

FIELD

The present disclosure relates to a system and a method for the identification of a mechanical component, in particular a rolling bearing ring.

BRIEF DESCRIPTION OF THE DRAWINGS

Certain non-limiting exemplary embodiments will now be described with reference to the attached drawings, in which.

DETAILED DESCRIPTION

As is known, in the industrial sector there exists in particular the need to check the origin of the components used, for example during the process for assembly of a machine or vehicle, and/or to be able to trace the production history of the said component, both during its production process, and subsequently, when the component is assembled on a complex machine or a vehicle.

For this purpose electronic labels (RFID—radiofrequency identification devices) can be employed. Such electronic labels, however, cannot be used during the production process, but only at the end thereof. Alternatively, markings (alphanumeric sequences, bar codes, QR codes, data matrices) may be used by forming them directly on a component.

For example, in order to ensure the traceability of mechanical components which are obtained by means of forging, casting and/or stock-removal machining, and which during the production process must be subject to various—both heat and chemical—treatments (tempering, stress-relieving treatment, phosphatization, etc.), laser markings may be used. Such laser markings may not be legible for the entire life of the component, and they may be deemed costly and may be subject to chemical attack both by a production processes (for example phosphatization) or by environmental contaminants (water, sludge, moisture, etc.) in the case of those components exposed to such contaminants during use, for example the rings of vehicle hub bearing units.

Shot-peening may also used, being theoretically more wear-resistant, but it may cause problems of cracking on the said component, for example if the shot-peening piston is large.

The object of the present disclosure is to provide a system and a method for the identification of a mechanical component, which does not have the drawbacks of other methods, whether during the component production steps or during the entire working life of the component. Embodiments in accordance with this disclosure are also time reliable, low-cost and do not risk damaging the component to be marked. Embodiments in accordance with this disclosure are generally applicable, and have been found to be particularly advantageous when used in connection with a ring of a rolling bearing or of a hub bearing unit of a vehicle. Accordingly, apparatus, systems, and methods for the identification of a mechanical component are provided.

Figure 2:
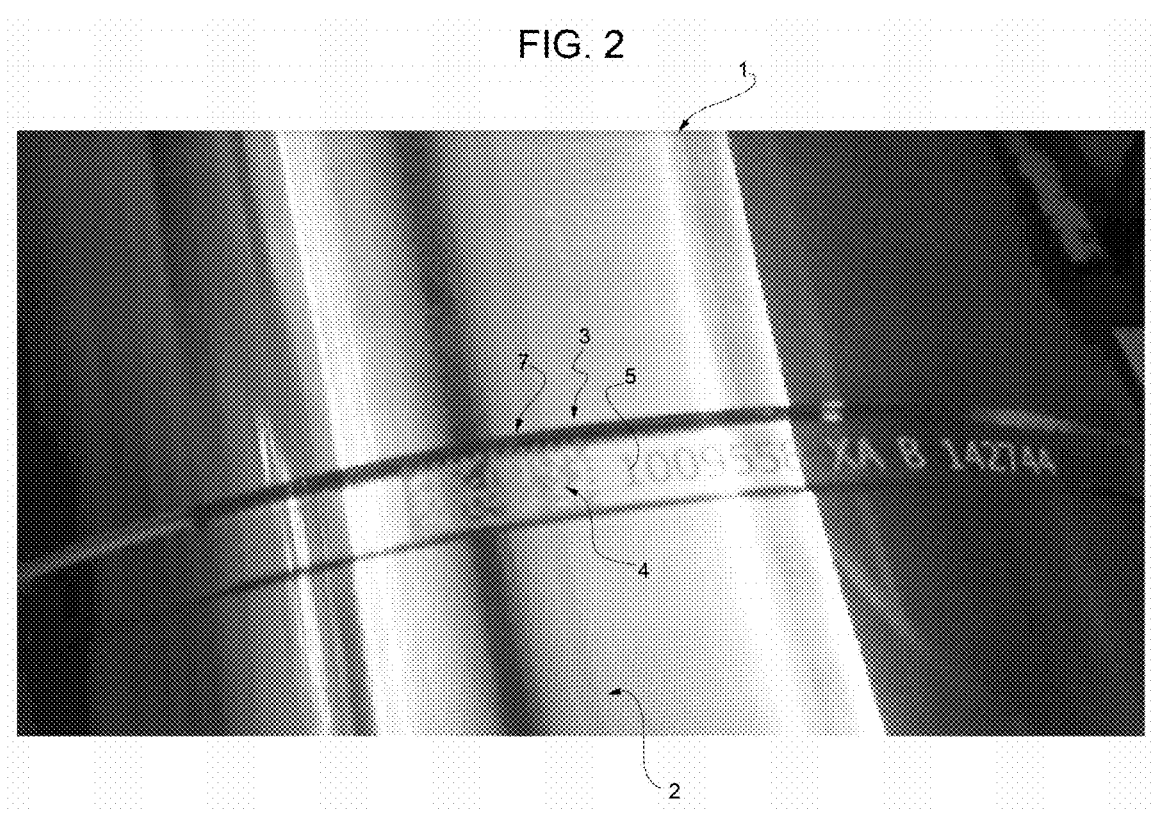
FIG. 2 shows a photographic illustration of the identification system according to the invention applied to a metallic mechanical component and obtained during tests with the method illustrated in FIG. 1.

With reference to FIG. 2, in it 1 denotes in its entirety a mechanical component. In the illustrated example the mechanical component is a metal ring formed of steel. The mechanical component 1 is generally a component of a machine or a vehicle, for example a rolling bearing or a vehicle hub bearing unit or a ring thereof. Upon reading this disclosure in full, one will appreciate that a mechanical component, e.g., 1, may alternatively be any suitable mechanical component one desires to mark.

The mechanical component 1 has, in the example shown, a cylindrical form and is provided with an exposed surface 2, in the example shown consisting of a metallic, cylindrical, external lateral surface of the mechanical component 1. If a mechanical component 1 has an annular form, the exposed surface 2 could also be internal lateral surface thereof, provided that it is easily accessible, or an annular, flat, front surface. Upon reading this disclosure in full, one will appreciate that many surfaces are suitable and embodiments are not limited to those explicitly described.

A mechanical component 1 is provided with an identification system 3 comprising exposed surface 2 and a marking 4 applied directly onto a surface 2 of a mechanical component 1.

As used herein "marking" is understood as meaning the graphical reproduction of an alphanumeric sequence, bar code, QR code, data matrix, logo, or the like.

In certain exemplary embodiments, a marking 4 is formed by a ceramic ink 5 applied directly onto the exposed surface 2. Such an ink 5 is at least partly in a vitrified state by being fired in a suitable manner.

In embodiments, a mechanical component, e.g., 1 has an annular form and the exposed surface 2 is an external or internal lateral surface thereof.

Moreover, as already mentioned, a mechanical component, e.g., 1 and/or an exposed surface, e.g., 2 on which a marking 4 has been applied is/are metallic.

Ceramic inks are known and are normally used to carry out decorations on ceramic tiles which are then fired at a high temperature. Prior to the present invention, it has been understood that it is not possible to apply a ceramic ink onto a metallic surface successfully.

In fact, there is a risk that a normal ceramic ink cannot adhere properly to a metal surface. According to exemplary embodiments, a ceramic ink 5 used to form the marking 4 is an ink that is photopolymerizable by means of UV light.

Typically the ink 5 contains one or more ceramic pigments, for example based on Fe, Cr, Zr, Al, Co, and the like depending on the desired colour, at least one aliphatic or glycol ether or water-based solvent, fatty diacids, esters and polyesters, preferably photopolymerizable by means of UV light.

For example, a typical composition of the inorganic part of the ceramic ink for obtaining a white-coloured marking 4 is the following:

| | | |
|---|---|---|
| $SiO_2$ | 18.50 | % |
| $TiO_2$ | 7.00 | % |

| | | |
|---|---|---|
| ZrO2 | 19.00 | % |
| SnO2 | 12.10 | % |
| Fe2O3 | 0.10 | % |
| BiO2 | 39.40 | % |
| CaO | Nr | % |
| CuO | Nr | % |
| MgO | Nr | % |
| MnO | Nr | % |
| ZnO | Nr | % |
| K2O | 0.80 | % |
| Li2O | 2.60 | % |
| Na2O | 0.50 | % |

Based on the description provided hitherto, certain exemplary embodiments therefore also include a method for identification of a mechanical component, e.g., 1. Such a method may be applied to identification of, e.g., a bearing or a hub bearing unit or a ring thereof. An exemplary method in accordance with this disclosure includes steps for providing a mechanical component, e.g., 1 with an exposed surface, e.g., 2 and applying directly a marking, e.g., 4 onto such exposed surface, e.g., 2 of such a mechanical component, e.g., 1.

Figure 1:
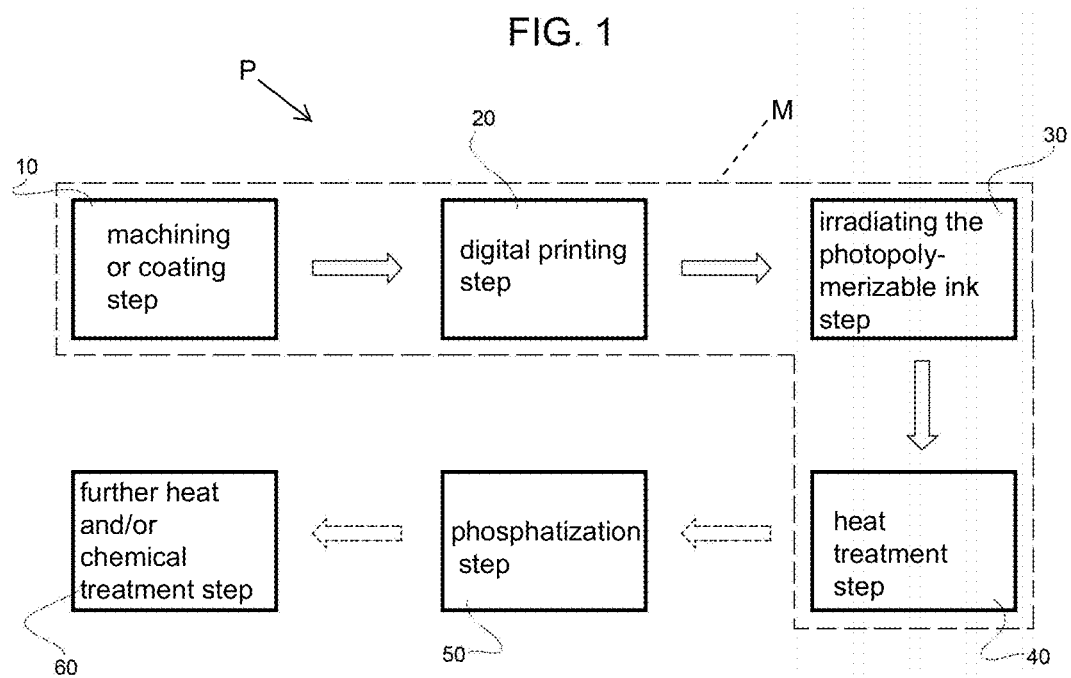
FIG. 1 illustrates in the form of a block diagram the main steps of an identification method according to the invention incorporated within a production flow diagram.

With reference to the block diagram shown in FIG. 1, during a first step 10 according to certain exemplary embodiments, an exposed surface, e.g., 2 is formed on a mechanical component, e.g., 1 in any known and suitable manner, for example by means of machining.

Here and below "exposed surface" is understood as meaning a surface of a mechanical component, e.g., 1.

During the step 10 it is attempted to obtain on an exposed surface, e.g., 2 having—at least in a zone, e.g., 7 thereof (FIG. 2) intended to receive the marking, e.g., 4—a relatively high-quality (low roughness) surface finish suitable for receiving a printed marking without blurring. For example, a surface, e.g., 2 or only a zone, e.g., 7 thereof may, if necessary, be ground or simply machined on a milling lathe (in the case of a flat surface 2) or it is possible to perform the hot or electrolytic deposition of a metallic layer (not shown) onto a zone, e.g., 7 alone of an otherwise rough surface, for example after obtaining a mechanical component, e.g., 1 by means of forging or casting.

Once the printable exposed surface, e.g., 2 has been obtained (for example at least in a zone 7) a digital printing step 20 is carried out in order to apply a marking, e.g., 4 onto a surface, e.g., 2.

According to certain exemplary embodiments, during a digital printing step 20, a marking, e.g., 4 is directly printed onto a exposed surface, e.g., 2 of mechanical component, e.g., 1 using a ceramic ink, e.g., 5, for example of any known type, which is applied using an inkjet printer which, according to an aspect of the exemplary embodiments, preferably has a resolution equal to, or greater than, 700 dpi (dots per inch), for example 720 dpi.

It has in fact been shown that the minimum value of about 700 dpi is a critical parameter of the method according to the exemplary embodiments since, at lower printing resolutions, it is not possible to ensure the legibility of the marking 4 when the latter consists of a data matrix, a QR code or also a simple bar code.

Thereafter, according to a further aspect of methods according to the certain exemplary embodiments, a heat treatment step 40 is carried out, after the digital printing step, to obtain the at least partial vitrification of the ceramic ink 5. During the heat treatment step 40 an exposed surface, e.g., 2 and/or an entire mechanical component, e.g., 1 is/are heated to a temperature and for a time sufficient to obtain at least partial vitrification of ceramic ink 5.

For this purpose, e.g., a heat treatment step 40 is carried out by heating the digitally printed exposed surface 2 to a temperature of between 200° C. and 700° C. or, in some embodiments, preferably higher than 700° C., depending on the type of ceramic ink used, for a few minutes, for example 2-3 minutes, in an electric or induction oven or by laser heating.

Laser heating offers the possible advantage of heating to a given temperature only a zone, e.g., 7 of a surface, e.g., 2 with a marking, e.g., 4 consisting of a ceramic ink, e.g., 5, instead of having to heat a whole mechanical component, e.g., 1 to said temperature. Finally it is possible also to perform heating of the entire mechanical component 1 in a gas oven, by suitably choosing ink 5 and the type of fuel to be used in order to avoid adverse chemical reactions.

According to at least one preferred embodiment, a ceramic ink, e.g., 5 is a photopolymerizable ink and, before the heat treatment step 40, a step 30 involving irradiation of the photopolymerizable ink 5 which has been digitally printed to form a marking, e.g., 4 is carried out in order to fix the ink on the exposed surface, e.g., 2, and wherein an exposed surface, e.g., 2 with a marking, e.g., 4 printed thereon is irradiated with UV light.

In embodiments, irradiation step 30 is performed immediately after a digital printing step 20 and is useful for ensuring a satisfactory adhesion of a marking, e.g., 4 on a surface, e.g., 2 when the latter is a curved metal surface, as in most cases. If this step 30 were not to be performed, it has in fact been shown in tests that the marking 4 formed on a curved metal surface 1 may be subject to blurring which would make a data matrix or QR code difficult to read.

The irradiation step 30 is carried out using a power of at least 10 watts per inch and by conveying the digitally printed exposed surface 2 past a UV lamp of the known type, not shown for simpler illustration, for a time period of one or more seconds.

It should be noted that the steps 30 and 40 may also be combined, using a UV light strong enough to produce localized hearing of the zone 7 and/or also only of the marking 4 alone. This latter heating method may also be used in the presence of ceramic inks without a photopolymerizable component.

Ceramic ink 5 to be used according to certain exemplary embodiments comprises preferably one or more ceramic pigments, which are chosen depending on the colour which is to be given to the marking 4, at least one aliphatic or glycol ether or water-based solvent, fatty diacids, esters and polyesters, preferably photopolymerizable by means of UV light. A possible composition of the ceramic part is that provided above for the colour white.

It is clear that it is possible to obtain a marking 4 with several colours using the method according to certain exemplary embodiments In this case it is sufficient for the step 20 to be carried out by means of a multi-head printer, using ceramic inks of varying colours, for example it is possible to use a four-colour inkjet printer, employing inks with pigments which reproduce the four primary colours so as to be able to realize any shade of colour.

After the heat treatment step 40 the mechanical component 1 is indelibly marked with a marking 4 which may contain a series of production data or simply a unique code which identifies the component in a specific manner. The steps 10-40 form overall a marking procedure M, shown schematically as a block marked off by a broken line containing the blocks 10-40, which may be inserted in a flow diagram of a complete production process P (FIG. 1).

According to an exemplary process P illustrated by way of a non-limiting example in FIG. 1, the mechanical component 1 with the marking 4 is then subjected to a phosphatization step 50 and thereafter to at least one further heat and/or chemical treatment step 60. It has been shown in tests that the marking 4 consisting of ceramic ink 5, at least partially vitrified by means of the step 40, is able to withstand chemical attack by the phosphatization step 50, together with the usual further processing steps 60, carried out for example on a component 1 consisting of a rolling bearing ring.

According to a possible variant of the process P, not shown for simpler illustration, the steps 50 and 60 and optionally other machining and/or heat treatment steps could be equally well carried out before the marking procedure M, which in this case would be carried out downstream of the production cycle and not upstream thereof, as shown in FIG. 1.

Owing to the method described it is also possible to insert a data matrix (or at least alphanumeric letters or sequences) on a forged ring, using in this an inkjet printer suitable for printing a surface 2 having a non-optimal surface finish, if, after this operation, the component/ring 1 may be passed through an oven, for example in order to perform an annealing step.

Owing to the exemplary embodiments it is possible to assign a unique name/code to the mechanical components 1 treated, for example to each ring of a plurality of rolling bearings or of a hub bearing unit, with the advantage that it possible to know the entire history of a single mechanical component 1 during its entire manufacturing process and, thereafter, during its entire working life.

Nowadays instead the traceability of a mechanical component is obtained by using a large amount of documentation (mainly paper documents).

With the identification system and method according to the exemplary embodiments it is therefore possible to save time and money and provide the purchaser of the component with detailed information about the product being purchased.

Furthermore, it should be possible, by means of four-colour printing, to print on the mechanical component 1 marking 4 which includes not only a data matrix or other coded graphic element, but also a logo, for example a client logo.

In addition to the embodiments described above, it must be understood that there exist numerous other variants. And in particular inventive wheel hubs are no constrained to the dimensions herein, and may also be employed in smaller, larger, and much larger wheel hubs. It must also be understood that these embodiments are only examples and do not limit either the scope of the invention, nor its applications, nor its possible configurations. On the contrary, although the description above allows the person skilled in the art to implement various embodiments of the present invention at least according to one of its examples of embodiment, it must be understood that many variants of the components described are possible, without thereby departing from the scope of the invention, as defined in the accompanying claims, interpreted literally and/or in accordance with their legal equivalents.

What is claimed is:

1. An identification system for a mechanical component comprising:
    a surface of the mechanical component, wherein the mechanical component is selected from a bearing, a hub bearing unit of a vehicle, and a ring of a hub bearing unit of a vehicle; and
    a marking applied directly on said surface of the mechanical component; wherein the marking is formed by a ceramic ink which is at least partially in a vitrified state; wherein at least one of the mechanical component and the marking is phosphatized.

2. The identification system according to claim 1, wherein the surface of the mechanical component is an external or internal lateral surface of the mechanical component, which is ring shaped.

3. The identification system according to claim 1, wherein at least one of the mechanical component and said surface of the mechanical component on which the marking is applied is metallic.

4. The identification system according to claim 1, wherein said surface of the mechanical component has been one of machined and coated with a metal layer by one of hot deposition and electrolytic deposition so as to have a low roughness.

5. A method for the identification of a mechanical component:
    providing the mechanical component with an exposed surface, wherein the mechanical component is selected from a bearing, a hub bearing unit of a vehicle, and a ring of a hub bearing unit of a vehicle;
    applying a marking directly on the exposed surface of the mechanical component, wherein said marking is formed by:
    a) digital printing the marking comprising directly printing the marking on the exposed surface of the mechanical component using a ceramic ink and an inkjet printer having a resolution equal to, or greater than, 700 dots per inch;
    b) heat treating the marking, performed after the digital printing, comprising heating at least one of said exposed surface and the whole mechanical component to a temperature and for a time sufficient to obtain at least partial vitrification of the ceramic ink; and
    c) phosphatizing at least one of the mechanical component and the marking.

6. The identification method according to claim 5, wherein the ceramic ink is a photopolymerizable ink; and
    further comprising irradiating the photopolymerizable ink so as to fix the photopolymerizable ink on the exposed surface and wherein the exposed surface with the marking printed thereon is irradiated with UV light, the irradiating the photopolymerizable ink being performed immediately after the digital printing.

7. The identification method according to claim 6, wherein the irradiating the photopolymerizable ink is performed using a power of at least 10 watts per inch and by conveying the digitally printed exposed surface past a UV lamp.

8. The identification method according to claim 5, wherein the heat treating is performed by heating the digitally printed exposed surface to a temperature of between 200° C. and 700° C. for at least two minutes, wherein the heat treating is performed by one of an electric oven, an induction oven, localized UV and laser heating.

9. The identification method according to claim 5, wherein the heat treating is performed by heating the digitally printed exposed surface to a temperature of at least 700° C. for at least two minutes, wherein the heat treating is performed by one of an electric oven, an induction oven, localized UV and laser heating.

10. The identification method according to claim 5, wherein the ceramic ink comprises one or more ceramic pigments, a fatty diacid, an ester, a polyester, and a solvent selected from an aliphatic solvent, a glycol ether solvent and a water-based solvent, wherein the ceramic ink is photopolymerizable by UV light.

11. The identification method according to claim 5, further comprising, before the digital printing, at least one of machining said exposed surface and coating said exposed surface with a metallic layer carried out by one of hot deposition and electrolytic deposition, in order to reduce roughness of the exposed surface.

12. A metallic mechanical component provided with an identification marking obtained with the method comprising:
    providing the mechanical component with an exposed surface, wherein the mechanical component is selected from a bearing, a hub bearing unit of a vehicle, and a ring of a hub bearing unit of a vehicle;
    applying a marking directly on the exposed surface of the mechanical component, wherein said marking is formed by:
    a) digital printing the marking comprising directly printing the marking on the exposed surface of the mechanical component using a ceramic ink and an inkjet printer having a resolution equal to, or greater than, 700 dots per inch;
    b) heat treating, performed after digital printing, comprising heating at least one of said exposed surface and the whole mechanical component to a temperature and for a time sufficient to obtain at least partial vitrification of the ceramic ink; and
    c) phosphatizing at least one of the mechanical component and the marking.

13. The metallic component according to claim 12, wherein the ceramic ink is a photopolymerizable ink; and
    further comprising irradiating the photopolymerizable ink so as to fix the photopolymerizable ink on the exposed surface and wherein the exposed surface with the marking printed thereon is irradiated with UV light, the irradiating the photopolymerizable ink being performed immediately after the digital printing.

14. The metallic component according to claim 12, wherein the irradiating the photopolymerizable ink is performed using a power of at least 10 watts per inch and by conveying the digitally printed exposed surface past a UV lamp.

15. The metallic component according to claim 12, wherein the heat treating is performed by heating the digitally printed exposed surface to a temperature of between 200° C. and 700° C. for at least two minutes, wherein the heat treating is performed by one of an electric oven, an induction oven, localized UV and laser heating.

16. The metallic component according to claim 12, wherein the heat treating is performed by heating the digitally printed exposed surface to a temperature of at least 700° C. for at least two minutes, wherein the heat treating is performed by one of an electric oven, an induction oven, localized UV and laser heating.

17. The metallic component according to claim 12, wherein the ceramic ink comprises one or more ceramic pigments, a fatty diacid, an ester, a polyester, and a solvent selected from an aliphatic solvent, a glycol ether solvent and a water-based solvent, wherein the ceramic ink is photopolymerizable by UV light.

18. The metallic component according to claim 12, further comprising, before the digital printing, at least one of machining said exposed surface and coating said exposed surface with a metallic layer carried out by one of hot deposition and electrolytic deposition, in order to reduce roughness of the exposed surface.

* * * * *